United States Patent [19]
Yasumura et al.

[11] Patent Number: 5,005,395
[45] Date of Patent: Apr. 9, 1991

[54] METHOD OF MANUFACTURING ELECTRIC WELDED PIPES UNDER HOT CONDITIONS

[75] Inventors: Ichiro Yasumura; Kuniharu Fujimoto, both of Ibaraki, Japan

[73] Assignee: Sumitomo Metal Industries, Ltd., Osaka, Japan

[21] Appl. No.: 499,908

[22] Filed: Mar. 27, 1990

Related U.S. Application Data

[62] Division of Ser. No. 225,191, Jul. 28, 1988, Pat. No. 4,945,743.

[51] Int. Cl.⁵ .................. B21D 5/12; B21D 51/00
[52] U.S. Cl. ............................. 72/128; 72/52; 72/181; 228/151
[58] Field of Search ............... 72/51, 52, 128, 178, 72/179, 181; 228/17, 17.5, 146, 147, 151

[56] References Cited

U.S. PATENT DOCUMENTS

| | | | |
|---|---|---|---|
| 2,370,387 | 2/1945 | Anderson | 228/17 |
| 2,563,214 | 8/1951 | Croson | 228/17.5 X |
| 2,575,381 | 11/1951 | Colby | 228/17.5 |
| 3,139,053 | 6/1964 | Hiroumi | 228/17 |
| 3,323,341 | 6/1967 | Chang | 72/178 |
| 3,791,020 | 2/1974 | Babbitt | 228/17 X |
| 3,938,724 | 2/1976 | Nakamura et al. | 228/17.5 X |
| 4,747,289 | 5/1988 | Nakamura | 72/178 |

FOREIGN PATENT DOCUMENTS

| | | | |
|---|---|---|---|
| 55-5165 | 1/1980 | Japan | 228/17.5 |
| 58-143908 | 8/1983 | Japan | . |
| 59-125214 | 7/1984 | Japan | 72/52 |

*Primary Examiner*—E. Michael Combs
*Attorney, Agent, or Firm*—Burns, Doane, Swecker & Mathis

[57] ABSTRACT

A method of producing an electric-welded pipe by continuously shaping a steel sheet into a tubular form in a hot condition is disclosed, which is characterized by employing a forming roll arrangement of the constant pass-line type in combination with the downward bending system.

43 Claims, 5 Drawing Sheets

1 (SHEET)

Fig. 5

1 (SHEET)

PULL OUT SQUEEZE

BREAK-DOWN

ROLL FORMING

FIN PASS

Fig. 6

EDGE LINE  V-ANGLE

WELDING POINT

FIN PASS NO.2 ROLL   SQUEEZE ROLL

1 (SHEET)

METHOD OF MANUFACTURING ELECTRIC WELDED PIPES UNDER HOT CONDITIONS

This application is a divisional of application Ser. No. 07/225,191, filed July 28, 1988, now U.S. Pat. No. 4,945,743.

BACKGROUND OF THE INVENTION

This invention relates to a method of efficiently and economically producing high quality electric welded pipes having precise dimensions.

Generally, electric welded pipes have been manufactured by performing cold rolling of a flat steel sheet into a tube and then by electrically welding the seam of the tube in a cold condition. Since the resistance to deformation of steel strip is large, roll forming in a cold condition is usually carried out gradually using a 9 or 10 stand rolling mill which comprises rough rolling stands such as breakdown roll stands and forming roll stands, and finishing roll stands such as fin-pass roll forming stands. In the prior art, it has been the practice to restrain the edge lines of the steel sheet during rolling by means of side guide rolls and the like. The roll forming process is easily carried out with high precision. The optimum shape for the caliber of a forming complicated operations and elaborate maintenance work. Therefore, high manufacturing costs are unavoidable.

Accordingly, it has been tried to produce electric welded tube under hot conditions, i.e., in a temperature range higher than the $Ar_3$ point, in which the resistance to deformation is very small and working can be performed using small-sized equipment. In the prior art, in the case of "butt welded tube" with a thin wall and a small diameter, roll forming into a tubular shape has been practiced under hot conditions. However, so-called electric-welded steel tube has a thicker wall and a larger diameter and requires a more complicated tube-forming process. It is said that for electric welded steel tube, roll forming under hot conditions has the following disadvantages, and that stable operation and high precision cannot be expected.

(a) Since the resistance to deformation of the starting steel sheet is low in a hot condition, but the edge lines thereof are easily damaged, it is impossible to employ side guide rolls and the like to restrain the edge lines of the sheet. Without such side guide rolls it is rather difficult to carry out roll forming in a stable manner.

(b) Deforming behavior of steel sheet under a hot condition is quite different from that in a cold condition. It is rather difficult in a hot condition to stably produce pipes having not only a precise shape and precise dimensions but also a weld of high quality.

(c) In contrast to cold rolling, the formation of scale during heating and processing is inevitable. Additional work is necessary to remove the scale. Such additional work sometimes disturbs a continuous manufacturing process. Scale remaining on a steel surface also has an adverse effect on the quality of the product.

(d) Hot roll forming is carried out at a point in time after steel sheet has been discharged from a heating furnace and before the sheet is welded. While being roll formed, the starting steel sheet is cooled nonuniformly, resulting in nonuniform temperature distribution around the periphery of the pipe. This temperature nonuniformity also prevents the manufacturing process from being performed smoothly. When the number of roll stands is increased in order to perform more stable roll forming, thermal losses and nonuniformity of the temperature distribution become quite significant, resulting in pipes of degraded quality as well as discontinuity of the process for manufacturing pipes.

SUMMARY OF THE INVENTION

Thus, an object of this invention is to provide a process for manufacturing electric welded steel pipes in a hot condition.

Another object of this invention is to provide a process for manufacturing electric welded steel pipes in a hot condition, which is free from the above-described problems of the prior art.

The present inventors carried out investigations aimed at developing a process for manufacturing electric welded steel pipes of high quality in a stable manner at lower cost in a hot condition utilizing deforming behavior which is totally different from that in a cold condition. As a result of these investigations, the following discoveries were made:

(I) In order to ensure precise abutting of the edge lines of the roll-formed tube without using side guide rolls, a forming system using a caliber arrangement of the so-called "constant pass-line" type is invariably employed. This type of constant pass line has never been employed in the production of electric welded pipes. Mostly, the constant bottom-line type has been discussed in the literature. It is very important to employ a series of rolls having a caliber arrangement of the constant pass-line type so as to decrease edge stretching.

Figure 2:
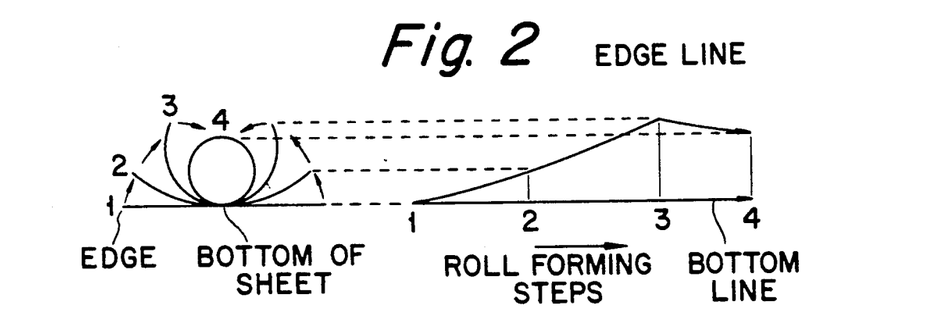
FIG. 2 illustrates the traveling distance of the center and edge portions of a steel sheet during forming by a roll forming process in which the calibers of the rolls are arranged so that the bottom line thereof is kept constant.
Figure 3:
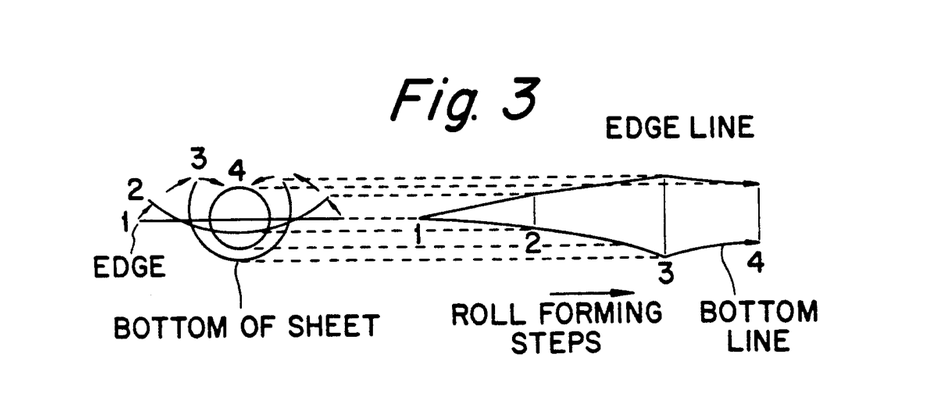
FIG. 3 illustrates the traveling distance of the center and edge portions of a steel sheet during forming by a roll forming process in which the calibers of the rolls are arranged so that the pass line thereof is kept constant.

Namely, in order to manufacture electric welded pipes in a cold condition, it is usual to employ calibers whose bottom line is kept constant, because it is easy to control the position of each of various roll stands. Such an arrangement is shown in FIG. 2, in which the central portion of a steel sheet 1, i.e., the bottom of the sheet is kept on a constant horizontal level. However, when this type of arrangement of calibers is employed in the production of hot-rolled electric-welded pipes, the traveling distance of edge portions is great, and the change in edge stretching is large. Therefore, prominent wavy lines are formed on the edges of the roll-formed sheet and opposing edges cannot be made to abut in a stable manner. In contrast, if the constant pass-line caliber system such as shown in FIG. 3 is employed to keep the pass line on a constant level, the traveling distance of edge portions of the roll-formed sheet will be relatively small so that the change in the edge stretching is decreased and smooth deformation is ensured. Thus, by employing the constant pass-line caliber system on a pipe-forming line having a small number of roll stands, it is possible to perform precise formation of a pipe in a hot condition in which the resistance to deformation is rather small. In addition, it is also possible to achieve good edge abutment and a satisfactory level of upsetting force. Furthermore, partly because the number of roll stands can be reduced, cooling of the steel sheet is carried out uniformly and the temperature distribution around the periphery of the pipe is as uniform as possible, resulting in an improvement in productivity as well as in the quality of the product.

(II) When an electric welded pipe is produced in a hot condition, it is necessary to cope with problems caused by the formation of scale, cooling water used in the post-treatment of the weld zone, and the like. However, if the "downward bending" system, i.e., the system to bend a sheet into a tubular form by bending it downwards is employed, these problems can be eliminated quite easily and completely. It is to be noted that the downward bending system has never been employed for producing electric welded pipes on an industrial scale, although it has been reported that some butt-welded pipes of a small diameter have been manufactured using the downward bending system.

Figures 4, 5, 6:
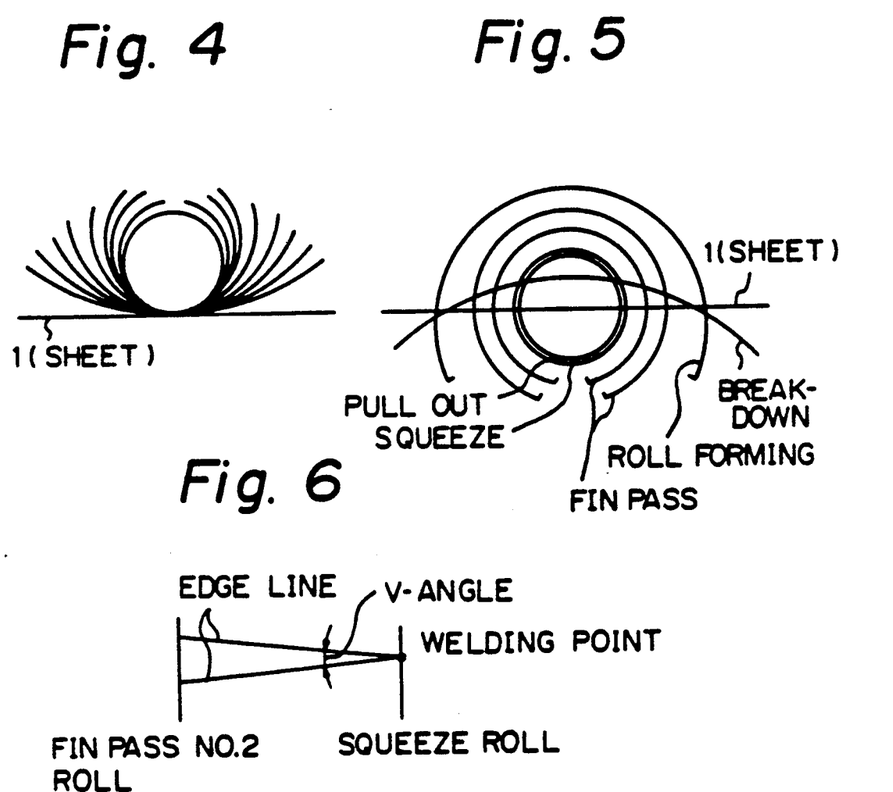
FIG. 4 illustrates the change in the shape of a steel sheet during forming by a roll forming process employing the upward bending system in which the calibers of the rolls are arranged so that the bottom line thereof is kept constant.
FIG. 5 illustrates the change in the shape of a steel sheet during forming by a roll forming process employing the downward bending system in which the calibers of the rolls are arranged so that the pass line thereof is kept constant.
FIG. 6 illustrates the V-angle for welding.

As shown in FIG. 4 according to the upward bending system, the scale formed during heating in a heating furnace is peeled off from the surface of the sheet during formation of the scale and is piled on the inner surface of the pipe, resulting in damage to an inner bead-cutting tool (not shown). In addition, cooling water for the bead-cutting tool collects within the pipe, and local cooling of part of the bottom portion of the pipe is inevitable. In contrast, as shown in FIG. 5, by employing the downward bending system, the peeled-off scale and the cooling water from the cutting tool are smoothly discharged from the opening provided at the bottom of the pipe during formation thereof. Thus, such problems can be eliminated.

(III) As described hereinbefore, by employing not only the constant pass-line caliber arrangement but also the downward bending system, it is possible to produce electric welded pipes in a hot condition on an industrial scale. Electric welded pipes can be more advantageously produced by restricting the conditions for calibers to specific ones and by adjusting the roll gap and the V-angle for welding at the welding point. The V-angle for welding means an angle defined by the edge lines of the sheet at the welding point, as shown in FIG. 6.

Thus, according to the above arrangement, the productivity as well as quality are improved to a desired level, and the production of electric welded pipes in a hot condition is practicable in respect to operability, product yield, and product quality. Thus, this invention resides in a method of producing an electric-welded pipe by continuously shaping a steel sheet into a tubular form in a hot condition preferably after heating to a temperature of the $A_3$ point or higher in a heating furnace, characterized by employing a forming roll arrangement in which the calibers are arranged in the manner of the constant pass-line type in combination with the downward bending system so as to produce electric welded pipes of high quality at lower cost in a hot condition.

In a preferred embodiment of this invention, the forming roll arrangement may comprise a pair of breakdown rolls, a pair of forming rolls, pairs of fin pass rolls, a pair of squeeze rolls, and a pair of pull-out rolls. The fin pass rolls may preferably comprise two or three pairs of fin pass rolls.

According to one embodiment of this invention, the method is carried out under the following conditions:

(i) the breakdown rolls are horizontal rolls having a caliber with a radius of curvature of 265-285 mm;
(ii) the forming rolls are vertical rolls with a double radius comprising an upper portion above the caliber center having a radius of curvature of $R_A$ (mm) and a lower portion below the caliber center having a radius of curvature of $R_B$ (mm), wherein the ratio of $R_B/R_A = 1.3-1.4$, the vertical rolls have a forming angle of 210-240°, and the caliber center thereof is placed at a position below the pass line such that $c/R_A = 0.18-0.25$, wherein "c" stands for the distance between the pass line and the caliber center;
(iii) the No. 1 (first) fin pass rolls are horizontal rolls having a fin angle of 45-65°, and the horizontal rolls are adjusted so that the reduction at the neutral axis of the steel sheet is 2.0-3.5% and the edge-forming angle thereof is 80-90°;
(iv) the No. 2 (last) fin pass rolls are horizontal rolls whose cross-sectional shape is a horizontally elongated ellipse with an aspect ratio of 1.05-1.13, the horizontal rolls have a fin angle of 22-35°, and the horizontal rolls are adjusted so that the reduction at the neutral axis of the steel sheet is 1.3-2.5%, the edge-forming angle thereof is 80-90°, the lower gap between the fin pass rolls and the squeeze rolls is 2.0-4.0 mm, and the upper gap between the fin pass rolls and the squeeze rolls is 3.0-5.0 mm;
(v) the squeeze rolls are vertical rolls whose cross-section is a vertically elongated ellipse with an aspect ratio of 1.01-1.025, the vertical rolls have a radius of curvature of 2.0-4.0 mm at the corner on the side which contacts the welding edges, and the vertical rolls are adjusted so that the reduction at the neutral axis of the steel sheet is 1.5-2.5%;
(vi) the pull-out rolls are horizontal rolls which have a circular caliber and which is adjusted so that the reduction at the neutral axis of the steel sheet is 0.7-1.5%; and
(vii) the forming roll gap is adjusted to be 0.5-1.0 mm, the gap of each of the fin pass roll, squeeze roll, and pull-out roll is adjusted to be within the range of 1.0-2.0 mm, and the V-angle for welding is adjusted to be 2-4°.

DESCRIPTION OF THE PREFERRED EMBODIMENTS

As mentioned above, one of the important features of this invention is that the forming rolls are arranged in a manner such that the calibers thereof are placed so as to maintain a constant pass line and such that the steel sheet is bent downward.

The reasons for employing these conditions for roll forming will be described with reference to the roll arrangement of FIG. 1.

Figure 1A:
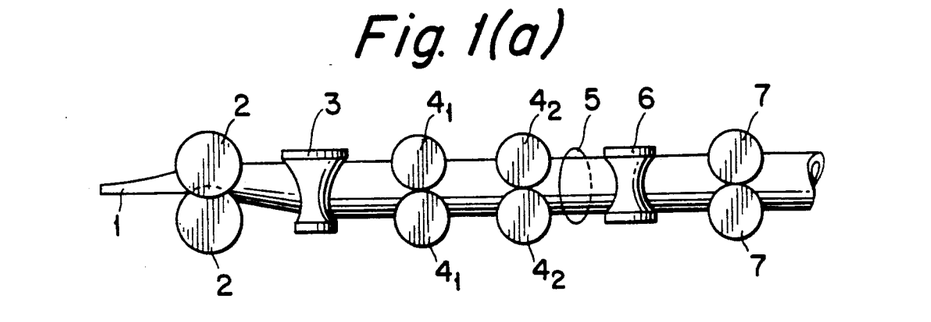
FIG. 1(a) is a schematic front view of a roll arrangement which this invention can employ so as to produce electric welded pipes in a hot condition.
Figure 1B:
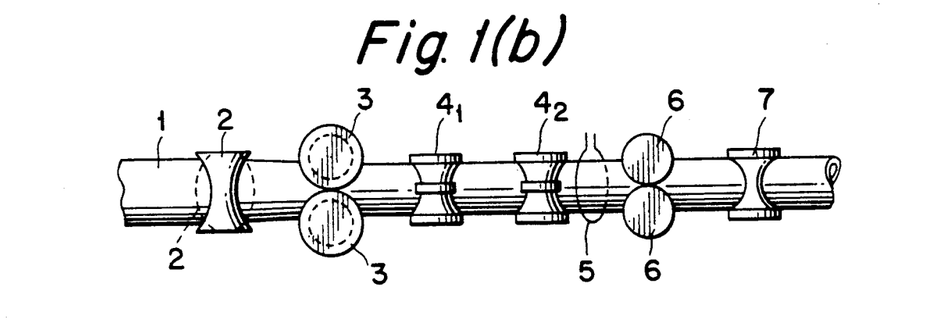
FIG. 1(b) is a schematic plan view of the arrangement of FIG. 1(a)

FIG. 1 is a schematic view of a roll arrangement which this invention can employ so as to produce electric welded pipes in a hot condition.

FIG. 1(a) is a front view, and FIG. 1(b) is a plan view of this arrangement.

In this example, breakdown rolls 2, 2 and forming rolls 3, 3 are used to perform rough forming with a forming angle of 210–240°.

Fin pass rolls $4_1$, $4_2$ are arranged horizontally at two stands, although three stands may instead be employed. The edge lines of the rough rolled steel sheet 1 are restrained. A V-shaped area for welding is formed and the angle thereof is adjusted.

After the shaping of the V-shaped area is completed and the edges are restrained, the edges of the steel sheet are heated using the work coil 5 of a high frequency induction heating apparatus, and the welding of the edges is carried out with squeeze rolls 6, 6. The welded pipe is then pulled downstream by pull-out rolls 7, 7.

In the arrangement shown in FIGS. 1(a) and 1(b), the distance between each of the neighboring stands is 350–800 mm and the distance from the exit of the heating furnace to the pull-out roll is not longer than 7 m, so that thermal losses may be kept as small as possible.

The process of forming, i.e., the change in the shape of the steel sheet during forming is shown in FIG. 5.

As can be seen from FIG. 5, according to this invention, the calibers of the forming rolls are arranged so as to maintain the pass lines thereof constant, and the sheet is bent downward, so that the production of electric welded pipes under hot conditions can be advantageously carried out.

In a preferred embodiment, the method of this invention is carried out more advantageously when the conditions of each of the rolls and the edges of the V-shaped area are determined in the previously-described manner. The method of this invention can then be carried out smoothly in a stabilized manner.

Figure 7:
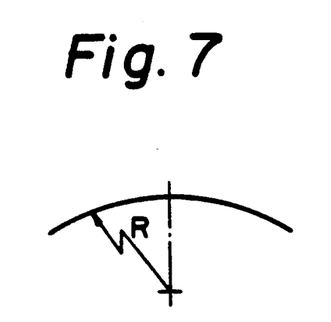
FIG. 7 is an illustration of part of a breakdown roll.
Figure 8:
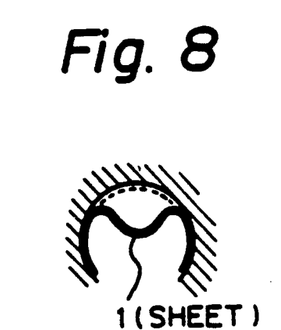
FIG. 8 illustrates the mechanism of buckling which sometimes occurs during shaping by roll forming.

The reasons for these conditions are as follows:

(i) Breakdown roll:

The radius of curvature of the caliber of the breakdown rolls (see FIG. 7) is restricted to 265–285 mm because the rolling load increases excessively due to over-forming when the radius of curvature is smaller than 265 mm and buckling of the steel sheet (see FIG. 8) easily occurs at the next roll stand, i.e., the forming roll stand due to short-forming when the radius of curvature is larger than 285 mm.

Figure 9:
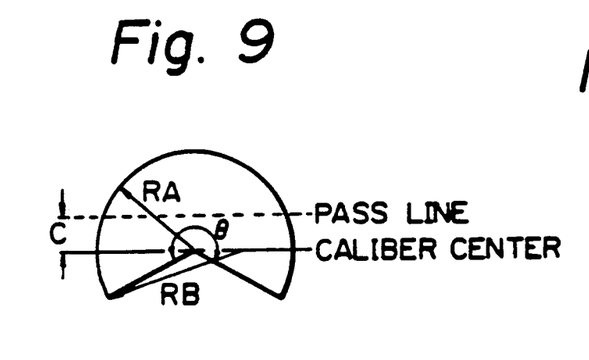
FIG. 9 is an illustration of part of a forming roll.
Figure 10:
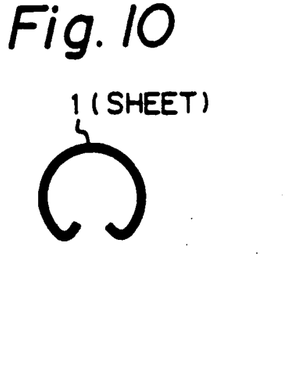
FIG. 10 illustrates the mechanism of buckling which easily occurs at the edges of a steel sheet during shaping by roll forming.

(ii) Forming Roll:

As shown in FIG. 9, the ratio of the radius of curvature $R_B$ (mm) for the lower portion below the caliber center to the radius of curvature $R_A$ (mm) for the upper portion above the caliber center $(R_B/R_A)$ is restricted to 1.3–1.4. This is because buckling of the steel sheet easily occurs at the next roll stand, i.e., the fin pass roll stand due to inward over-bending of the edge portions of the steel sheets shown in FIG. 10 when the ratio is smaller than 1.3, and the forming becomes unstable due to excess forming at the next stand, i.e., the fin pass roll stand when the ratio is larger than 1.4.

In addition, the caliber center of the forming rolls is placed at a position below the pass line which satisfies the equation $c/R_A = 0.18$–$0.25$, wherein "c" stands for the distance between the pass line and the caliber center (see FIG. 9). If the ratio $c/R_A$ is in the above-defined range, the amount of stretching of each of the edge portions and the center portion of the steel sheet will be equal. When the ratio falls outside the above-defined range, the amount of stretching of either the edge portions or the center portion becomes much larger than the amount of stretching of the other one.

The forming angle of the forming roll (angle $\theta$ in FIG. 9) is restricted to 210–240°. When the angle is smaller than 210°, the forming at the next stand, i.e., the fin pass roll stand is excessive, resulting in unstable operation. When the angle is over 240°, there is a tendency for the steel sheet to buckle easily at the fin portion of the next roll stand, i.e., the fin pass roll stand due to inward over-bending of the edge portions of the steel sheet.

Figure 11:
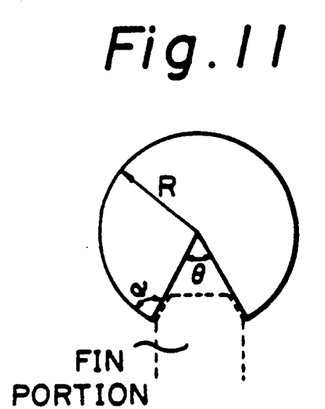
FIG. 11 is an illustration of part of the No. 1 fin pass roll.
Figure 12:
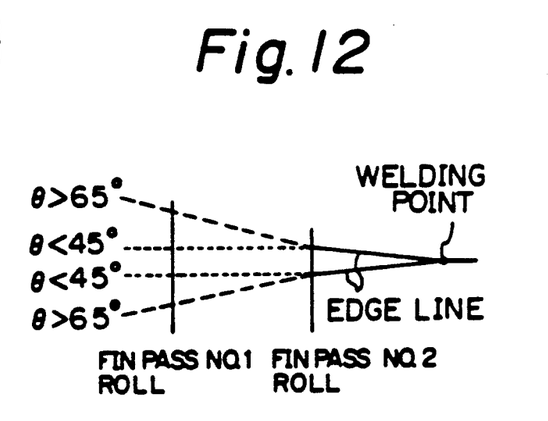
FIG. 12 is an illustration of a point of inflection which is sometimes formed in the edges of a steel sheet.

(iii) No. 1 Fin Pass Roll:

The fin angle $\theta$ of the No. 1 (first) fin pass roll is restricted to 45–65°. See FIG. 11. When the angle falls outside the range of 45–65°, the inflection point occurs along the edge lines of the steel sheet at the point of the No. 2 fin pass rolls, resulting in unstable forming (see FIG. 12).

In addition, according to this invention, the steel sheet is restrained by applying forces in the widthwise direction during forming in the fin pass roll stand, and the reduction at the neutral axis of the steel sheet is restricted to 2.0–3.5%. When the reduction is smaller than 2.0%, the restraining force is inadequate to suppress the movement of the sheet in the widthwise direction. On the other hand, when the reduction is larger than 3.5%, buckling of the sheet at the edges easily occurs due to over-reduction.

Figure 13:
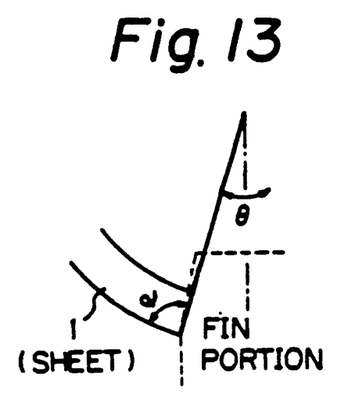
FIG. 13 is an illustration of the edge forming angle of the fin pass roll.

Furthermore, the edge forming angle $\alpha$ of the steel sheet (see FIGS. 11 and 13) is restricted to 80–90°. It is necessary to avoid the formation of a thin-walled portion due to over-cutting when removing inner and outer welding beads using a cutting tool after welding. For this purpose the edge portions of the sheet are thickened previously during the fin pass rolling. The larger the edge forming angle $\alpha$, the larger the reduction in the inner side, resulting in an increase in wall thickness. However, when the angle is smaller than 80°, the reduction in the inner side becomes too large to adequately roll down the outer side of the sheet upon being welded. Furthermore, when the angle is larger than 90°, the reduction on the inner side is inadequate. Thus, according to this invention, the angle is restricted to 80–90°.

Figure 14:
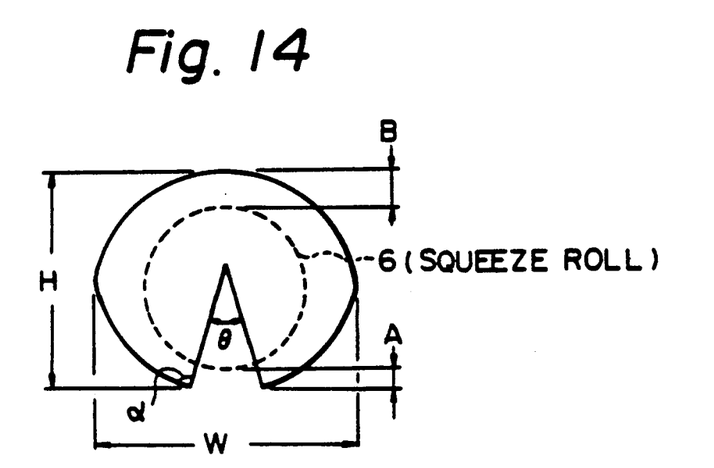
FIG. 14 is an illustration of part of the No. 2 fin pass roll.

(iv) No. 2 Fin Pass Rolls:

As shown in FIG. 14, the cross-sectional shape of the No. 2 (last) fin pass rolls is elliptical so that the distance between the sheet formed by the No. 1 fin pass rolls and the flange portion of the No. 2 fin pass rolls is smaller than the distance of the groove bottom. Therefore, the deformation of the sheet will start from the groove bottom and will end at the flange portion, resulting in a short contact length between the sheet and the flange portion and less formation of flaws. When the aspect ratio, i.e., the ratio of W/H in FIG. 14 is smaller than 1.05, it is impossible to avoid the formation of roll flaws and when the ratio is larger than 1.13, oscillating movement of the sheet in the widthwise direction, i.e., rolling easily occurs during forming in the next stand, i.e., in the squeeze rolls.

In addition, the fin angle $\theta$ is restricted to 22–35° because forming becomes unstable due to the generation of an inflection point in edge portions of the sheet when the fin angle falls outside the range of 22–35°.

Furthermore, the reduction at the neutral axis of the steel sheet is 1.3–2.5%. When the reduction is smaller than 1.3%, the restraining force acting on the sheet is inadequate, resulting in oscillating movement in the widthwise direction of the sheet during forming. When the reduction is larger than 2.5%, buckling of the edge portions of the sheet easily occurs due to over-reduction.

The reasons why the edge forming angle is restricted to 80–90° are that the inner side reduction becomes so large that the outer side reduction is too small during welding when the angle is smaller than 80°, and the inner side reduction is much smaller than the desired level when the angle is larger than 90°.

When the steel sheet is passed to the squeeze rolls, the abutment of the edges can be carried out smoothly because of the generation of tension due to the presence of a lower gap "A" (see FIG. 14) between the No. 2 fin pass rolls (finish fin pass rolls) and the squeeze rolls. When the gap "A" is smaller than 2.0 mm, the edge portions become wavy due to lack of tension, and when the gap is over 4.0 mm, roll flaws easily form because of a long contact length between the flanges of the squeeze rolls and the edge portions of the sheet. Thus, according to this invention, the lower gap from the bottom of the squeeze roll is restricted to 2.0–4.0 mm. When the upper gap "B" (see FIG. 14) is over 5.0 mm, the contact length between the flanges of the squeeze rolls and the edge portions of the sheet is so long that roll flaws occur easily. On the other hand, when the upper gap is smaller than 3.0 mm, oscillating movement (rolling) in the widthwise direction occurs easily due to lack of tension. The upper gap "B" is defined as 3.0–5.0 mm.

Figure 15:
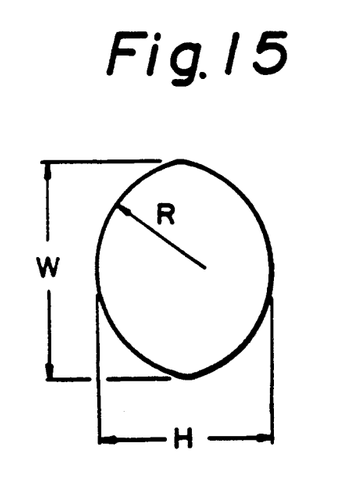
FIG. 15 is an illustration of part of the squeeze roll.

(v) Squeeze roll:

The reasons why the aspect ratio of the squeeze rolls (the ratio of W/H in FIG. 15) is restricted to 1.01–1.025 are that the contact length between the squeeze rolls and the sheet is so long that the roll flaws are formed after the sheet is formed into a horizontally-elongated ellipse in the No. 2 (last) fin pass rolls and is passed through the squeeze rolls when the aspect ratio is smaller than 1.01, and oscillating movement of the sheet in the widthwise direction (rolling) easily occurs when the aspect ratio is larger than 1.025.

Figure 16:
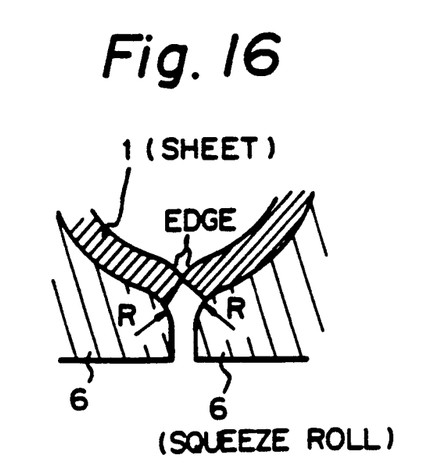
FIG. 16 is an illustration of the shape of squeeze rolls at the corners thereof which contact welding edges.

The radius of curvature R (see FIG. 16) at the corners on the sides where the squeeze rolls contact the welding edge of the steel sheet is restricted to 2.0–4.0 mm. When the radius of curvature is smaller than 2.0 mm, the formation of roll flaws is inevitable at the corners, and when the radius of curvature is larger than 4.0 mm, the edge portions are bent outwards resulting in inadequate abutment of the edge portions of the sheet.

Furthermore, the reason why the reduction at the neutral axis of the steel sheet is defined as 1.5–2.5% is that when the reduction is smaller than 1.5%, the squeezing of the molten steel during welding is inadequate so that weld decays are often found, and when the reduction is larger than 2.5%, buckling of the edge portions of the sheet easily occurs due to over-reduction.

(vi) Pull-out roll:

The reduction produced by the pull-out rolls at the neutral axis of the steel sheet is restricted to 0.7–1.5%. When the reduction is smaller than 0.7%, oscillating movement in the widthwise direction (rolling) is inevitable due to a decrease in the restraining force. When the reduction is larger than 1.5%, the formation of a local thickening of the wall of the resulting pipe is inevitable because the temperature of the welded zone is high and the resistance to deformation is small.

The roll gap at each of the roll stands, i.e., the distance between the flanges of the opposing rolls is adjusted as necessary depending on the thickness of the sheet at the breakdown rolls, and the gap is set as small as possible at the forming rolls since there is no need to adjust this gap. However, when the roll gap at the forming rolls is smaller than 0.5 mm, there is a possibility that the opposing flanges will contact each other, resulting in damage thereto during the application of a roll forming force. On the other hand, when the roll gap is over 1.0 mm, the occurrence of squeeze-out of the steel sheet from the flange portions is inevitable. Thus, the roll gap at the forming rolls is adjusted to be 0.5–1.0 mm.

In addition, the roll gap for each of the fin pass rolls, squeeze rolls and pull out rolls is adjusted so as to be within the range of 1.0–2.0 mm. This is because it is necessary to provide a roll gap of 1.0 mm or more and squeeze-out of the steel sheet from the flange portions easily occurs when the gap is over 2.0 mm.

The V-angle of the V-shaped area is adjusted to be 2–4°. As was already mentioned, the V-angle means the angle between the edges of a steel sheet passing from the No. 2 fin pass rolls (finish fin pass rolls) to the point where the edges abut in the squeeze rolls. This V-angle has a great influence on the weld quality and is determined on the basis of the previously-mentioned dimensions and positions of calibers of each of the No. 2 fin pass rolls and the squeeze rolls. The optimum values for this angle are 2–4°. When the V-angle is smaller than 2°, the distance between the opposing edges of the sheet is small so that when there are fluctuations in the forming speed and the degree of tension, premature contact of the edges occurs easily, resulting in a short circuit which in turn causes weld defects. When the V-angle is over 4°, wavy edges are easily formed since the length of the edge line is rather long and edge stretching is increased.

It will be apparent to those skilled in the art from the foregoing that this invention is able to be applied to the production of hot-shaped seam-welded pipes using an upward-bending system. The applicability of this invention is not affected by roll-forming conditions such as the roll size or the characteristics of the starting steel sheet. Various kinds of steel sheet may be used as the starting steel sheet in this invention, resulting in electric-welded pipes of high quality.

Some working examples of this invention will next be described in conjunction with the attached drawings.

EXAMPLES

A steel sheet measuring 4.0 mm thick and 420 mm wide and made of Si-Al-killed steel (0.07% of C, 0.20% of Si, 0.25% of Mn) was used to manufacture seam-welded pipe having an outer diameter of 114.3 mm. The manufacturing apparatus which was employed was the one shown in FIG. 1, and the forming conditions were as follows:

(a) the radius of curvature (R) of the caliber of the breakdown rolls was 271 mm;

(b) the radius of curvature of the upper portion from the caliber center $R_A$ of the forming rolls was 110.125 mm and the radius of curvature of $R_B$ of the lower portion from the caliber center was 147.925 mm ($R_B/R_A=1.34$), the distance "c" between the pass line and the caliber center was 22.0 mm ($c/R_A=0.2$), and the forming angle $\theta$ was 220°;

(c) the reduction through the No. 1 fin pass rolls at the neutral axis of the steel sheet was 3.19%, the fin angle was 47.0°, and the edge forming angle thereof $\alpha$ was 86°;

(d) the aspect ratio W/H of the No. 2 fin pass rolls was 1.06, the lower gap "A" below the squeeze rolls was 3.0 mm, the upper gap "B" above the squeeze rolls was 3.64 mm, the reduction at the neutral axis of the steel sheet was 1.5%, the fin angle $\theta$ was 24.3°, and the edge forming angle $\alpha$ was 83°,;

(e) the aspect ratio W/H of the squeeze rolls was 1.015, the radius of curvature R at the corners was 3.0 mm, and the reduction at the neutral axis of the steel sheet was 1.72%;

(f) the reduction through the pull-out rolls at the neutral axis of the steel sheet was 0.77%; and (g) the roll gaps were 0.57 mm for the forming rolls, 1.42 mm for the No. 1 fin pass rolls, 1.27 mm for the No. 2 fin pass rolls, 1.35 mm for the squeeze rolls and 1.49 mm for the pull-out rolls, and the weld V-angle was 2.05°.

The temperature of the starting steel sheet at the entrance side of the forming roll stands was 900° C. and the temperature thereof at the exit side of the pull-out roll stand was 850° C.

It was confirmed that according to this invention high-quality electric-welded pipes having precise dimensions were manufactured efficiently and economically.

Figure 17:
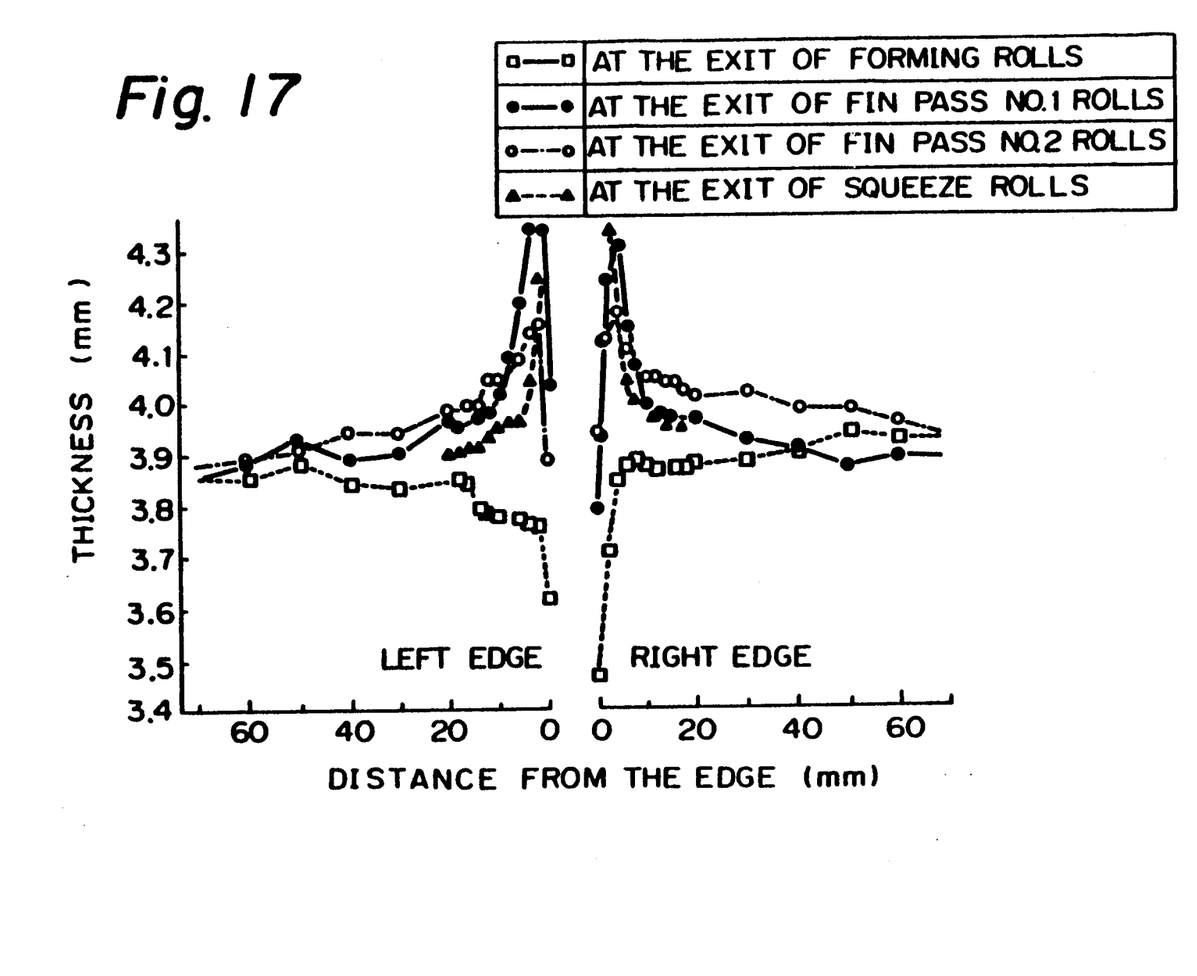
FIG. 17 is a graph of test results of a working example of this invention showing the thickness distribution in an area near the edge of a steel sheet.

FIG. 17 is a graph of the test results of the working example of this invention, which shows the thickness distribution in an area near the edges of the steel sheet.

As is apparent from the test results shown in FIG. 17, according to this invention, although a reduction in wall thickness occurred due to edge stretching when the steel sheet passed through the forming rolls, uniform thickening of the wall portions was achieved along both edges when the sheet passed through the fin pass rolls, and stable abutment was achieved.

Furthermore, various steel sheets of different types of steel having a thickness of 3.0-8.0 mm were employed to manufacture hot-formed electric-welded pipes having a diameter of 21.7-114.3 mm substantially under the same conditions. The welding was carried out successfully to give satisfactory abutment.

Thus, according to this invention, high quality hot-formed electric-welded pipes can be manufactured in a stable manner.

Although the invention has been described with preferred embodiments it is to be understood that variations and modifications may be employed without departing from the concept of the invention a defined in the following claims.

We claim:

1. A method of producing an electric-welded pipe by continuously shaping a steel sheet as it passes from upstream to downstream along a constant pass-line into a tubular form in a hot condition, said shaping step being performed with a forming roll arrangement comprising a series of roll stands of a constant pass-line type in combination with a downward bending system said shaping step including positioning the sheet so as to substantially lie in a horizontal plane and bending the sheet with respect to a vertical plane extending perpendicular to said horizontal plane such that a central portion of the sheet is bent upwardly away from said horizontal plane and edges of the sheet which are joined together are bent downwardly away from said horizontal plane, said pipe formed after said shaping step having a central axis substantially coplanar with said horizontal plane.

2. A method as defined in claim 1, wherein the forming roll arrangement comprises a pair of breakdown rolls, a pair of forming rolls, at least an upstream pair and a downstream pair of fin pass rolls, a pair of squeeze rolls, and a pair of pull-out rolls.

3. A method as defined in claim 2, wherein the fin pass rolls comprise only said upstream and downstream pairs of fin pass rolls.

4. A method as defined in claim 1, wherein the steel sheet is heated to a temperature of the $A_3$ point or higher before being passed through said forming roll arrangement.

5. A method of producing an electric-welded pipe by continuously passing a steel sheet from upstream to downstream along a constant pass-line through a forming roll arrangement comprising breakdown rolls, forming rolls, fin pass rolls, an electric heating means, squeeze rolls, and pull-out rolls and shaping the steel sheet into a tubular form in a hot condition with the forming roll arrangement, the forming roll arrangement being of a constant pass-line type in combination with a downward bending system said shaping step including positioning the sheet so as to substantially lie in a horizontal plane and bending the sheet with respect to a vertical plane extending perpendicular to said horizontal plane such that a central portion of the sheet is bent upwardly away from said horizontal plane and edges of the sheet which are joined together are bent downwardly away from said horizontal plane, said pipe formed after said shaping step having a central axis substantially coplanar with said horizontal plane.

6. A method as defined in claim 5, wherein the forming roll arrangement comprises a pair of breakdown rolls, a pair of forming rolls, at least an upstream pair and a downstream pair of fin pass rolls, a pair of squeeze rolls, and a pair of pull-our rolls.

7. A method as defined in claim 6, wherein the fin pass rolls comprise only the upstream and downstream pairs of fin pass rolls.

8. A method as defined in claim 5, wherein the steel sheet is heated to a temperature of the $A_3$ point or higher before being passed through said forming roll arrangement.

9. A method of producing an electric welded pipe by continuously shaping a steel sheet as it passes from upstream to downstream along a constant pass-line into a tubular form in a hot condition by means of a forming roll arrangement which comprises breakdown rolls, forming rolls, at least an upstream pair of fin pass rolls and a downstream pair of fin pass rolls, squeeze rolls, and pull-out rolls, and said rolls of said arrangement have calibers arranged in the manner of a constant pass line type in combination with a downward bending system, the method being carried out by the following steps:
 (i) providing said breakdown rolls as horizontal rolls having a caliber with a radius of curvature of 265-285 mm;
 (ii) providing said forming rolls as vertical rolls having a double radius comprising an upper portion above a caliber center having a radius of curvature of $R_A$ and a lower portion below the caliber center having a radius of curvature of $R_B$ (mm), wherein the ratio $R_B/R_A = 1.3-1.4$, said forming rolls having a forming angle in the range of 210-240°, and said caliber center thereof being placed at a position below the pass line which satisfies the equation $c/R_A = 0.18-0.25$, wherein "c" stands for the distance between said pass line and said caliber center;
 (iii) providing said upstream fin pass rolls as horizontal rolls which have a fin angle of 45-65°, and positioning said upstream fin pass rolls so that the reduction at a neutral axis of the steel sheet is 2.0-3.5% and an edge forming angle thereof is 80-90°;
 (iv) providing said downstream fin pass rolls as horizontal rolls which have a horizontally-elongated cross section and an aspect ratio of 1.05-1.13, which have a fin angle of 22-35°, and positioning said downstream fin pass rolls so that the reduction at said neutral axis of the steel sheet is 1.3-2.5%, an edge forming angle thereof is 80-90°, a lower gap between the downstream fin pass rolls and the squeeze rolls is 2.0-4.0 mm, and an upper gap between the downstream fin pass rolls and the squeeze rolls is 3.0-5.0 mm;
 (v) providing said squeeze rolls as vertical rolls which have a vertically-elongated elliptical cross section and an aspect ratio of 1.01-1.025, a radius of curvature of 2.0-4.0 mm at corners adjacent sides which contact a weld edge of the steel sheet, and positioning said squeeze rolls so that the reduction at said neutral axis of the steel sheet is 1.5-2.5%;
 (vi) providing said pull out rolls as horizontal rolls which have a circular caliber and positioning said pull out rolls so that the reduction at said neutral axis of the steel sheet is 0.7-1.5%; and
 (vii) adjusting said forming roll gap to be 0.5-1.0 mm, adjusting a gap of each of the fin pass rolls, squeeze rolls, and pull-out rolls to be within the range of 1.0-2.0 mm, and adjusting a V-angle for welding to be 2-4°.

10. A method as defined in claim 9, further comprising adjusting a distance between adjacent pairs of said rolls to be 350-800 mm.

11. A method as defined in claim 9, further comprising heating the steel sheet in a heating furnace provided upstream of the forming roll arrangement, and adjusting a distance between an exit of the heating furnace and the pull-out rolls to be not longer than 7 meters.

12. A method as defined in claim 2, wherein each of said forming rolls has a surface which shapes the sheet during the shaping step, said surface having a double radius comprising an upper portion and a lower portion above and below, respectively, a center of the pipe being formed, said upper portion having a radius of curvature of $R_A$ and said lower portion having a radius of curvature $R_B$, $R_B$ being larger than $R_A$.

13. A method as defined in claim 12, wherein a caliber center of said forming rolls is located a distance "c" below the pass line such that $c/R_A$ is equal to about 0.18 to 0.25 and stretching of edge portions and a center portion of the sheet will be about equal during the shaping step by said forming rolls, $R_B/R_A$ being about 1.3 to 1.4.

14. A method as defined in claim 2, wherein edges of the sheet are thickened during the shaping step by said fin pass rolls.

15. A method as defined in claim 2, wherein a cross-sectional shape of working surfaces of said downstream fin rolls is elliptical with a major axis thereof extending in a horizontal direction.

16. A method as defined in claim 2, wherein a cross-sectional shape of working surfaces of said squeeze rolls is elliptical with a major axis thereof extending vertically.

17. A method as defined in claim 2, wherein wall thickness of the sheet is reduced due to edge stretching when the sheet passes through said forming rolls and uniform thickening of wall portions is achieved along both edges of the sheet when the sheet passes through said fin pass rolls.

18. A method as defined in claim 6, wherein each of said forming rolls has a surface which shapes the sheet, said surface having a double radius comprising an upper portion and a lower portion above and below, respectively, a center of the pipe being formed, said upper portion having a radius of curvature of $R_A$ and said lower portion having a radius of curvature $R_B$, $R_B$ being greater than $R_A$.

19. A method as defined in claim 18, wherein a caliber center of said forming rolls is located a distance "c" below the pass line such that $c/R_A$ is equal to about 0.18 to 0.25 and stretching of edge portions and a center portion of the sheet will be about equal during the shaping step by said forming rolls, $R_B/R_A$ being about 1.3 to 1.4.

20. A method as defined in claim 6, wherein edges of the sheet are thickened during the shaping step by said fin pass rolls.

21. A method as defined in claim 6, wherein a cross-sectional shape of working surfaces of said downstream fin rolls is elliptical with a major axis thereof extending in a horizontal direction.

22. A method as defined in claim 6, wherein a cross-sectional shape of working surfaces of said squeeze rolls is elliptical with a major axis thereof extending vertically.

23. A method as defined in claim 6, wherein wall thickness of the sheet is reduced due to edge stretching when the sheet passes through said forming rolls and uniform thickening of wall portions is achieved along both edges of the sheet when the sheet passes through said fin pass rolls.

24. A method as defined in claim 1, wherein the sheet lies substantially in a horizontal plane prior to said shaping step and said pipe formed after said shaping step has a central axis substantially coplanar with said plane.

25. A method as defined in claim 5, wherein the sheet lies substantially in a horizontal plane prior to said shaping step and said pipe formed after said shaping step has a central axis substantially coplanar with said plane.

26. A method of producing an electric-welded pipe comprising heating a steel sheet to a temperature of the $A_3$ point or higher and continuously shaping the heated steel sheet as it passes from upstream to downstream along a constant pass-line into a tubular form, said shaping step being performed with a forming roll arrangement comprising a series of roll stands of a constant pass-line type in combination with a downward bending system, said shaping step including positioning the sheet so as to substantially lie in a horizontal plane, and bending the sheet with respect to a vertical plane extending perpendicular to said horizontal plane such that a central portion of the sheet is bent upwardly away from said horizontal plane and edges of the sheet which are joined together are bent downwardly away from said horizontal plane, said pipe formed after said shaping step having a central axis substantially coplanar with said horizontal plane.

27. A method as defined in claim 26, wherein the shaping step is performed with a forming roll arrangement which comprises a pair of breakdown rolls, a pair of forming rolls, at least an upstream pair and a downstream pair of fin pass rolls, a pair of squeeze rolls, and a pair of pull-out rolls.

28. A method as defined in claim 27, wherein the fin pass rolls comprise only said upstream and downstream pairs of fin pass rolls.

29. A method as defined in claim 26, wherein each of said forming rolls has a surface which shapes the sheet during the shaping step, said surface having a double radius comprising an upper portion and a lower portion above and below, respectively, a center of the pipe being formed, said upper portion having a radius of curvature of $R_A$ and said lower portion having a radius of curvature $R_B$, $R_B$ being larger than $R_A$.

30. A method as defined in claim 29, wherein a caliber center of said forming rolls is located a distance "c" below the pass line such that $c/R_A$ is equal to about 0.18 to 0.25 and stretching of edge portions and a center portion of the sheet will be about equal during the shaping step by said forming rolls, $R_B/R_A$ being about 1.3 to 1.4.

31. A method as defined in claim 26, wherein edges of the sheet are thickened during the shaping step by said fin pass rolls.

32. A method as defined in claim 26, wherein a cross-sectional shape of working surfaces of said downstream fin rolls is elliptical with a major axis thereof extending in a horizontal direction.

33. A method as defined in claim 26, wherein a cross-sectional shape of working surfaces of said squeeze rolls is elliptical with a major axis thereof extending vertically.

34. A method as defined in claim 26, wherein wall thickness of the sheet is reduced due to edge stretching when the sheet passes through said forming rolls and uniform thickening of wall portions is achieved along both edges of the sheet when the sheet passes through said fin pass rolls.

35. A method of producing an electric-welded pipe by heating a steel sheet to a temperature of the $A_3$ point or higher and continuously passing the heated steel sheet from upstream to downstream along a constant pass-line through a forming roll arrangement comprising breakdown rolls, forming rolls, fin pass rolls, an electric heating means, squeeze rolls, and pull-out rolls and shaping the steel sheet into a tubular form in a hot condition with the forming roll arrangement, the forming roll arrangement being of a constant pass-line type in combination with a downward bending system said shaping step including positioning the sheet so as to substantially lie in a horizontal plane, and bending the sheet with respect to a vertical plane extending perpendicular to said horizontal plane such that a central portion of the sheet is bent upwardly away from said horizontal plane and edges of the sheet which are joined together are bent downwardly away from said horizontal plane, said pipe formed after said shaping step having a central axis substantially coplanar with said horizontal plane.

36. A method as defined in claim 35, wherein the shaping step is performed with the forming roll arrangement which comprises a pair of breakdown rolls, a pair of forming rolls, at least an upstream pair and a downstream pair of fin pass rolls, a pair of squeeze rolls, and a pair of pull-out rolls.

37. A method as defined in claim 36, wherein the fin pass rolls comprise only the upstream and downstream pairs of fin pass rolls.

38. A method as defined in claim 36, wherein each of said forming rolls has a surface which shapes the sheet, said surface having a double radius comprising an upper portion and a lower portion above and below, respectively, a center of the pipe being formed, said upper portion having a radius of curvature of $R_A$ and said lower portion having a radius of curvature $R_B$, $R_B$ being greater than $R_A$.

39. A method as defined in claim 38, wherein a caliber center of said forming rolls is located a distance "c" below the pass line such that $c/R_A$ is equal to about 0.18 to 0.25 and stretching of edge portions and a center portion of the sheet will be about equal during the shaping step by said forming rolls, $R_B/R_A$ being about 1.3 to 1.4.

40. A method as defined in claim 36, wherein edges of the sheet are thickened during the shaping step by said fin pass rolls.

41. A method as defined in claim 36, wherein a cross-sectional shape of working surfaces of said downstream fin rolls is elliptical with a major axis thereof extending in a horizontal direction.

42. A method as defined in claim 36, wherein a cross-sectional shape of working surfaces of said squeeze rolls is elliptical with a major axis thereof extending vertically.

43. A method as defined in claim 36, wherein wall thickness of the sheet is reduced due to edge stretching when the sheet passes through said forming rolls and uniform thickening of wall portions is achieved along both edges of the sheet when the sheet passes through said fin pass rolls.

* * * * *